(12) United States Patent
Molnar et al.

(10) Patent No.: US 7,804,499 B1
(45) Date of Patent: Sep. 28, 2010

(54) VARIABLE PERFORMANCE RASTERIZATION WITH CONSTANT EFFORT

(75) Inventors: Steven E. Molnar, Chapel Hill, NC (US); Franklin C. Crow, Portola Valley, CA (US); Blaise A. Vignon, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 409 days.

(21) Appl. No.: 11/467,665

(22) Filed: Aug. 28, 2006

(51) Int. Cl.
*G06T 15/30* (2006.01)
(52) U.S. Cl. ................................. 345/423; 345/422
(58) Field of Classification Search ............. 345/422, 345/423
See application file for complete search history.

(56) References Cited

U.S. PATENT DOCUMENTS

| | | | |
|---|---|---|---|
| 5,929,862 A | 7/1999 | Barkans | |
| 5,977,987 A | 11/1999 | Duluk, Jr. | |
| 6,275,241 B1 | 8/2001 | Tanaka | |
| 6,359,623 B1 | 3/2002 | Larson | |
| 6,518,974 B2 | 2/2003 | Taylor et al. | |
| 6,556,203 B1 | 4/2003 | Nelson | |
| 6,630,933 B1 | 10/2003 | Van Hook | |
| 6,633,297 B2 | 10/2003 | McCormack et al. | |
| 6,956,576 B1 * | 10/2005 | Deering et al. | 345/475 |
| 7,145,565 B2 * | 12/2006 | Everitt et al. | 345/426 |
| 7,372,471 B1 * | 5/2008 | Hutchins | 345/611 |
| 2003/0184555 A1 | 10/2003 | Fraser | |
| 2006/0077209 A1 * | 4/2006 | Bastos et al. | 345/613 |
| 2006/0139365 A1 * | 6/2006 | Naoi | 345/582 |
| 2006/0170703 A1 * | 8/2006 | Liao | 345/613 |
| 2006/0209065 A1 * | 9/2006 | Lapidous et al. | 345/422 |

OTHER PUBLICATIONS

Morein, S., "Ati Radeon Hyper-z Technology" In presentation at Hot3D Proceedings, part of Graphics Hardware Workshop, 2000.

* cited by examiner

*Primary Examiner*—Xiao M Wu
*Assistant Examiner*—Maurice McDowell, Jr.
(74) *Attorney, Agent, or Firm*—Patterson & Sheridan, LLP (57) ABSTRACT

The current invention involves new systems and methods for providing variable rasterization performance suited to the size and shape of the primitives being rendered. Portions of pixel tiles that are fully covered by a graphics primitive are encoded and processed by the system as rectangles, rather than expanding to explicit samples. This accelerates the rendering of large primitives without increasing the computation resources used for rasterization. In some embodiments, these fully-covered regions can be rendered compressed without ever expanding into samples.

15 Claims, 8 Drawing Sheets

VARIABLE PERFORMANCE RASTERIZATION WITH CONSTANT EFFORT

BACKGROUND OF THE INVENTION

1. Field of the Invention

One or more aspects of the invention generally relate to computer graphics, and more particularly to rasterizing graphics primitives without necessarily computing per-pixel samples.

2. Description of the Related Art

Conventional graphics processors are exemplified by systems and methods developed to rasterize graphics primitives by computing per-pixel samples. Increasingly, graphics applications operate in a variety of differing rendering regimes that have different memory bandwidth needs and different rasterization requirements. For example, portions of a graphics application may render geometry with complex shaders, wherein rendering performance is dominated by per-pixel color value computations. Memory bandwidth may limit the rendering performance when multiple textures are used by the complex shaders. Other portions of the graphics application may render occluder depth values, stencil shadow volumes, or large background polygons using either a trivial shader or no shader. The rendering performance for these portions of the graphics application may be limited by rasterization rates, particularly when a high number of samples are used per-pixel. The available memory bandwidth may be underutilized, particularly when compression is used without a shader or with a trivial shader.

Accordingly, there is a need for rasterization performance to increase when rendering performance is not limited by shading computations.

SUMMARY OF THE INVENTION

The current invention involves new systems and methods for improving rasterization performance when per-sample coverage information is not needed for rendering. Portions of pixel tiles that are fully covered by a graphics primitive are not rasterized to produce per-sample coverage information. Therefore, computational resources used for rasterization are applied as needed to perform edge testing to generate coverage information only for portions of the pixel tiles that are partially covered by the graphics primitive. Rasterization throughput is increased when entire pixel tiles or portions of pixel tiles are completely covered by a graphics primitive. Consequently, rasterization is no longer a performance bottleneck for large graphics primitives, particularly when trivial shaders are used. Rasterization performance is also increased when sub-pixel samples are used and fully covered sample values are compressed. Rendering performance may be improved without increasing the computation resources used for rasterization by eliminating unnecessary coverage computations.

Various embodiments of a method of the invention for varying rasterization performance based on graphics primitive pixel tile coverage include receiving pixel tile data for a portion of the graphics primitive that intersects a pixel tile, determining whether the pixel tile is fully or partially covered by the portion of the graphics primitive, dividing the pixel tile data into sample shapes when the pixel tile is partially covered by the portion of the graphics primitive, computing coverage masks for any partially covered sample shapes, and encoding a shape code for each one of the partially covered sample shapes based on the coverage masks.

Various embodiments of the invention include a system for producing shape data for pixel tiles. The system includes a tile divider unit and a sample coverage evaluator. The tile divider unit is configured to divide a pixel tile that is partially covered by a graphics primitive into sample shapes and identify a first portion of the sample shapes that are partially covered by the graphics primitive, a second portion of the sample shapes that are completely covered by the graphics primitive, and a third portion of the sample shapes that are not covered by the graphics primitive. The sample coverage evaluator is configured to evaluate edge equations for the graphics primitive and produce per-sample coverage masks only for the first portion of the sample shapes, wherein the shape data includes the coverage masks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

When a complex shader is used to render graphics primitives with multiple texture maps, the rendering performance typically is limited by memory bandwidth needed to read the texture maps or by shading computation resources. Rasterization throughput does not typically limit rendering performance when complex shaders are used. In contrast, rasterization throughput may limit rendering performance when trivial or no shaders are used. It typically is desirable to increase rasterization throughput to the point of saturating memory bandwidth in order to achieve the highest graphics processing performance. The rasterization throughput may be increased by simply increasing the computational throughput of the rasterizer, resulting in a larger rasterizer that requires more die area and consumes more power. The larger rasterizer will be underutilized when complex shaders are used.

Rather than increasing the computational throughput of the rasterizer, rasterization performance may be increased by not computing per-sample coverage information for portions of pixel tiles that are fully covered by a graphics primitive. The computational resources used for rasterization are applied as needed to perform edge testing to generate coverage information only for portions of the pixel tiles that are partially covered by the graphics primitive, since if a tile of pixels is fully-covered, all samples within that tile are known to be covered without further computation. Elimination of unnecessary per-sample coverage computations also improves rendering performance when early z or late z testing modes are used. Rasterization throughput may be increased for large graphics primitives, particularly when trivial shaders are used.

Rasterization performance may also be improved for fully covered tiles when sub-pixel samples are used for a multi-sample mode. Fully covered pixel tiles or portions of pixel tiles may be efficiently compressed and shaded at a higher rate. Therefore, it is desirable to also increase the rasterization rate for fully covered pixel tiles when a multisample mode and/or compression is used to improve the rendering performance. A constant effort rasterizer may provide variable performance depending on the pixel tile coverage of the graphics primitives being processed and the shader program. This accelerates the rendering of large primitives without increasing the computation resources used for rasterization.

Figure 1:
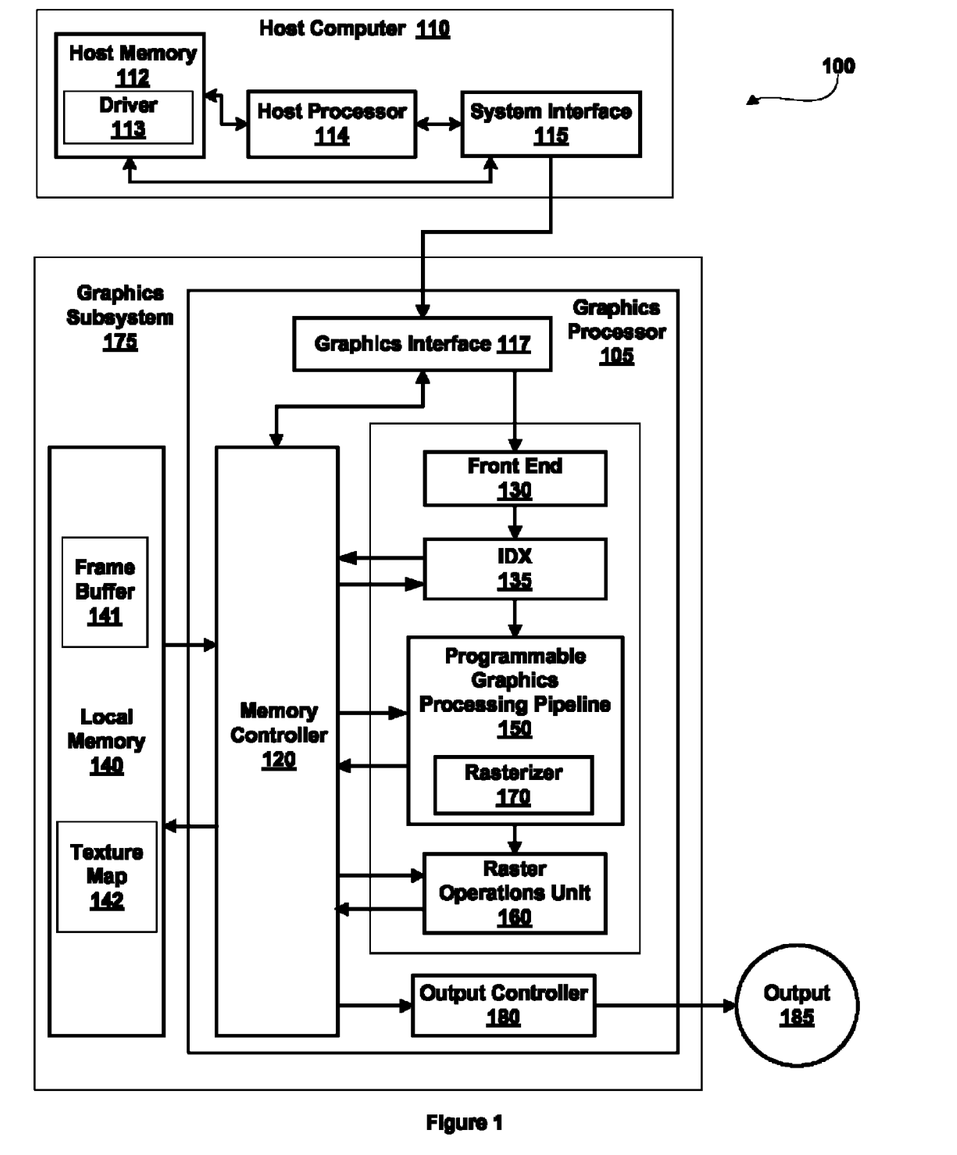
FIG. 1 is a block diagram of an exemplary embodiment of a respective computer system in accordance with one or more aspects of the present invention including a host computer and a graphics subsystem.

FIG. 1 illustrates a computing system generally designated 100 including a host computer 110 and a graphics subsystem 175, including texture unit 175, in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. Examples of system interface 115 known in the art include Intel® Northbridge.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, driver 113 may configure a rasterizer 170 to compute per-pixel sample values for all pixels within a graphics primitive or configure a rasterizer 170 to use the techniques of the present invention to avoid computing per-pixel sample values for portions of fully covered tiles within the graphics primitive. Rasterizer 170 determines pixel tiles and portions of pixel tiles that are fully covered. Rather than rasterizing the fully covered pixel tiles and portions of pixel tiles to produce per-sample coverage information, rasterizer 170 efficiently communicates the fully covered state of the pixel tiles and portions of pixel tiles to downstream processing units. The downstream processing units may then compute per-sample coverage information for the pixel tiles and portions of pixel tiles as needed. Driver 113 may also configure a raster operations unit 160 to write compressed data to a frame buffer 141 to reduce data transfers between local memory 140 and graphics processor 105.

Host computer 110 communicates with graphics subsystem 175 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor, including texture maps. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. Programmable graphics processing pipeline 150 may include several multi-threaded processing units. A multithreaded processing unit may receive first geometry, such as higher-order surface data, and tessellate the first geometry to generate second geometry, such as vertices. A multithreaded processing unit may be configured to transform the second geometry from an object-based coordinate representation (object space) to an alternatively based coordinate system such as world space or normalized device coordinates (NDC) space. Each multithreaded processing unit may include a read interface to read program instructions and graphics data such as texture maps from local memory 140 or host memory 112 via memory controller 120.

The multithreaded processing units and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, anisotropic texture filtering, interpolation, compression, decompression, and the like. The multithreaded processing units and raster operations unit 160 are each optionally configured such that data processing operations are performed in multiple passes through those units or in multiple passes within programmable graphics processing pipeline 150. Raster operations unit 160 also includes a write interface to memory controller 120 through which data can be written to memory.

In a typical implementation, programmable graphics processing pipeline 150 performs geometry computations, rasterization, and pixel computations. Therefore, the multithreaded processing units are programmed to operate on surface, primitive, vertex, fragment, pixel, sample or any other data. For simplicity, the remainder of this description will use the term "samples" to refer to graphics data such as pixels, fragments, sub-pixel samples, or the like, and the term "geometry" to refer to graphics data such as surfaces, primitives, vertices, or the like. At least one set of geometry is output by IDX 135 and received by programmable graphics processing pipeline 150. A set of samples or geometry is processed according to at least one program, e.g., primitive, vertex, or shader program. A program can process one or more sets of samples or geometry. Conversely, a set of samples or geometry can be processed by a sequence of one or more programs.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in a render target, e.g., frame buffer 141, texture map 142, or the like in local memory 140. When the data received by graphics subsystem 175 has been completely processed by graphics processor 105, an output 185 of graphics subsystem 175 is provided using an output controller 180. Output controller 180 is optionally configured to deliver data to a display device, network, electronic control system, other computing system 100, other graphics subsystem 175, or the like. Alternatively, data is output to a film recording device or written to a peripheral device, e.g., disk drive, tape, compact disk, or the like.

In some embodiments of computing system 100 graphics processing performance is limited by memory bandwidth, e.g. between host memory 112 and programmable graphics processor 105, between local memory 140 and graphics processing pipeline 103, and the like. In those embodiments using a texel cache to reduce the number of texels read from local memory 140 or host memory 112 may improve graphics processing performance when complex shader programs are executed. Storing texture maps and frame buffer data in a compressed format may also be used to reduce the bandwidth requirements and improve graphics processing performance when the memory bandwidth is saturated.

Figure 2:
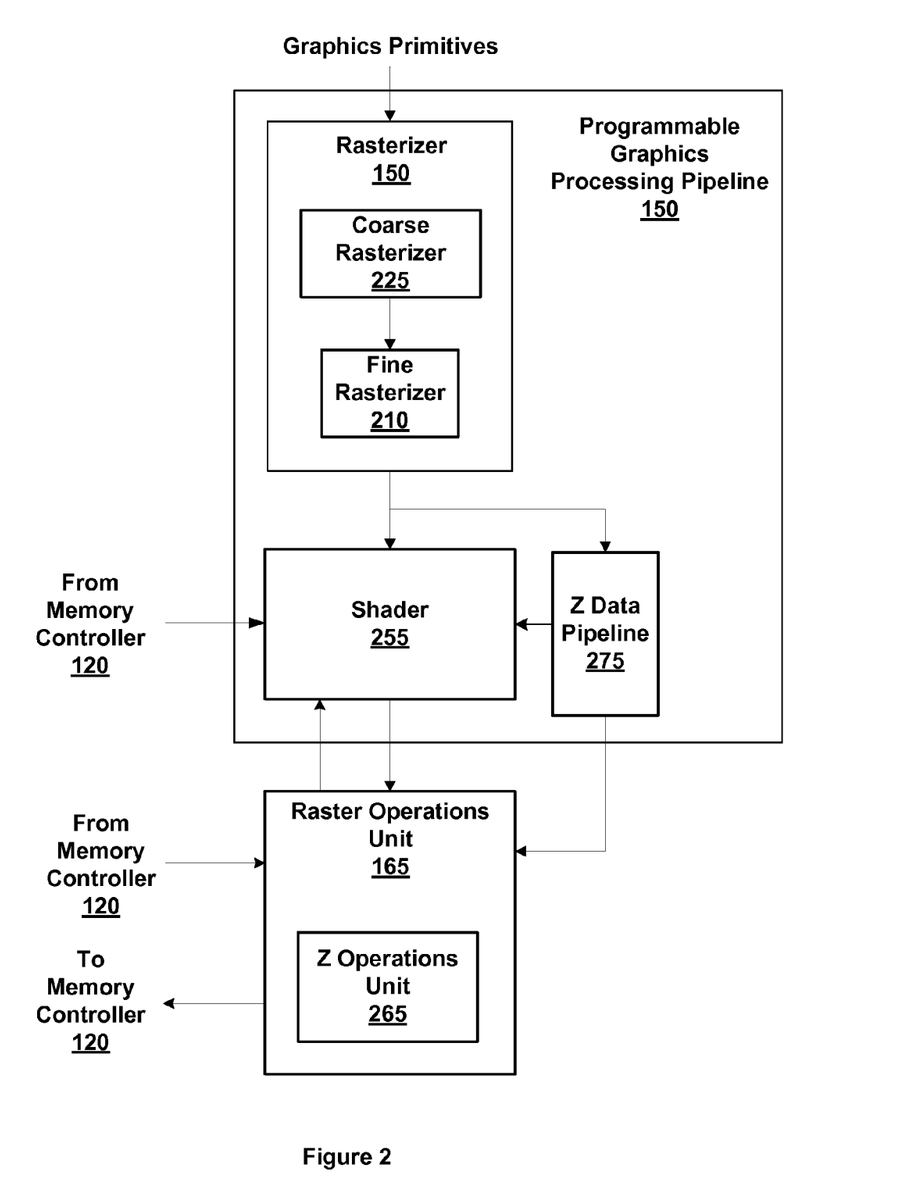
FIG. 2 is a block diagram of the programmable graphics processing pipeline and raster operations unit of FIG. 1 in accordance with one or more aspects of the present invention.

FIG. 2 is a block diagram of programmable graphics processing pipeline 150 and raster operations unit 160 of FIG. 1 in accordance with one or more aspects of the present invention. Graphics primitives may be assembled from vertices and then rasterized to produce fragments for pixels, including coverage information. Program instructions configure multithreaded processing units to perform operations such as tessellation, perspective correction, texture mapping, shading, blending, and the like, to produce processed samples or geometry. One or more multithreaded processing units within programmable graphics processing pipeline 150 may be configured to execute primitive, vertex, or shader programs and are represented in FIG. 2 as a shader 255. The processed samples are output from programmable graphics processing pipeline to raster operations unit 160.

Rasterizer 150 receives plane equation coefficients, typically produced by a triangle setup unit, for a primitive defining one or more parameters, e.g., texture coordinates, color components, and z. For example, z plane equation coefficients, A, B, and C may be used to compute a z value at any position (x,y) within the primitive by evaluating the plane equation:

$$Z\text{ value}=Ax+By+C.$$

Likewise, plane equation coefficients for other parameters, e.g. color components red, green, blue, alpha, and the like, may be used to compute values of the other parameters within the primitive.

Rasterizer 150 is a sampling unit that processes graphics primitives and generates sub-primitive data, such as pixel data or fragment data, including coverage data. Coverage data indicates which sample positions within a pixel tile are "covered" by a fragment formed by the intersection of the pixel tile and a primitive, where a pixel tile is a region of pixels or sample positions in screen space, as described in conjunction with FIGS. 3A, 3B, 3C, and 3D. Graphics primitives include geometry, such as points, lines, triangles, quadrilaterals, meshes, surfaces, and the like. Rasterizer 150 converts graphics primitives into sub-primitive fragment data, performing scan conversion on the graphics primitives. Rasterizer 150 uses a set of fixed or programmed sample positions, the set may be specified by a multisample mode provided by driver 113. A single sample position or multiple sample positions for each pixel may be included in the set. Rasterizer 150 outputs fragment data to a multithreaded processing unit for execution of a shader program.

Rasterizer 150 includes a coarse rasterizer 225 and fine rasterizer 210. Coarse rasterizer 225 determines the pixel tiles that intersect each graphics primitive and effectively discards the pixel tiles that lie completely outside of the graphics primitive. Coarse rasterizer 225 outputs pixel tiles that are completely covered by a graphics primitive or are intersected by an edge of a graphics primitive, i.e., include at least one covered pixel to fine rasterizer 210. Fine rasterizer 210 breaks each pixel tile down into smaller units, sample shapes, as described in conjunction with FIG. 3A and FIGS. 3B, 3C, 3D, 5A, and 5B. Fine rasterizer 210 also determines a sample shape code for each sample shape and computes a per-sample coverage mask for each partially covered sample shape. Fine rasterizer 210 outputs the sample shapes and coverage information, including the coverage code and any coverage masks.

Rasterizer 150 outputs a portion of the fragment data, e.g., z plane equation data, pixel positions, the sample shapes, and coverage information, to a z data pipeline 175. Z data pipeline 175 may include a storage resource such as a first-in first-out (FIFO) memory, register file, random access memory (RAM), or the like. The plane equation data may include tile specific z plane equation coefficients defining z values for the fragment within a sample shape. Z data pipeline 275 provides a bypass for sample shapes that are not processed by shader 255.

Rasterizer 150 outputs another portion of the fragment data, e.g., plane equation data for color components and texture coordinates, pixel positions, the sample shapes, and coverage information, to a z data pipeline 175. Shader 255 computes and processes color values for one or more sample positions using the fragment data for each sample shape and techniques known to those skilled in the art. Shader 255 may also compute z values for one or more sample positions using the plane equation data stored in z data pipeline 275. Alternatively, shader 255 may compute z values without using the plane equation data stored in z depth data pipeline 275 or shader 255 may not compute z values.

The multithreaded processing unit outputs the processed fragment data coverage and pixel position for each sample shape to raster operations unit 165. A z operations unit 265 within raster operations unit 165 trivially rejects or accepts sample shapes based on z bounds testing, as described in conjunction with FIG. 3B. When necessary, z operations unit 265 determines z values for each sample position using sample positions specified by the multisample mode and plane equation data received from rasterizer 150. Z operations unit 265 may also be configured to perform decompression, compression, and hidden surface removal, i.e., z testing. In some embodiments of the present invention, raster operations unit 165 receives the per-sample z values (included within the processed fragment data) from shader 255 or z data pipeline 275.

Raster operations unit 165 includes a read interface and a write interface to memory controller 120 through which raster operations unit 165 accesses data, including compressed z data, stored in local memory 140 or host memory 112. Raster operations unit 165 optionally performs near and far plane clipping and raster operations, such as stencil, blending, and the like, using the compressed or uncompressed fragment data stored in local memory 140 or host memory 112 at a pixel position (image location specified by x,y coordinates) associated with the processed fragment data. The output data from raster operations unit 165 is written back to local memory 140 or host memory 112 at the pixel position associated with the output data and the results, e.g., image data, compressed z data, and the like, are saved in graphics memory.

When compressed z data is output by raster operations unit 165, a higher rasterization throughput may be needed to saturate the memory bandwidth. Therefore, it is desirable for the rasterization throughput to increase for z-only processing, particularly when compression is used, compared with shader intensive processing when compression may not be used. Scaling the rasterization throughput allows for the graphics processing performance of different rendering regimes to not be limited by the rasterization throughput.

In some embodiments of the present invention, z operation unit 265 is configured to perform early z testing before shading. Z pass flags produced by z operations unit 265 are output by raster operations unit 165 to shader 255. Shader 255 discards samples that are queued for processing, thereby reducing the shading workload for processing samples that would otherwise be eliminated during z testing. Using early z testing during rendering of large geometry may result in increased rendering performance when primitives fail the depth test since those failing primitive will not be shaded. When complex shaders are used the performance improvement may be even greater since the shading throughput will be improved when primitives that will fail the depth test are eliminated prior to shading.

In other embodiments of the present invention, z operation unit 265 is configured to perform late z testing before raster operations are performed on color samples. Z pass flags produced by z operations unit 265 are used by raster operations unit 165 to discards samples that are queued for processing, thereby reducing the raster operations workload for processing samples that would otherwise be eliminated during z testing.

Finally, shader 255 may be configured to operate in a "z only" mode, meaning that shading operations are not performed. When large geometry is used in z only mode the processing throughput of rasterizer 170 may be improved by eliminating per-sample coverage computations and instead encoding shape data for pixel tiles to efficiently represent fully covered pixel tiles or portions of pixel tiles.

Figure 3A:
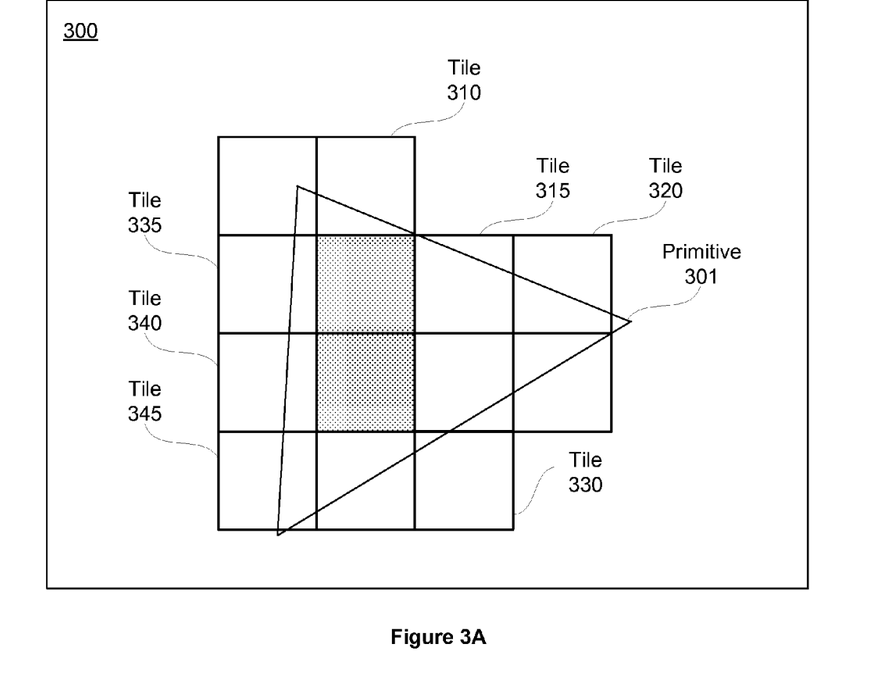
FIG. 3A is a conceptual diagram showing pixel coverage of a graphics primitive in accordance with one or more aspects of the present invention.

FIG. 3A is a conceptual diagram showing pixel tile coverage of a graphics primitive 301, in accordance with one or more aspects of the present invention. The shaded pixel tiles are fully covered by primitive 301 and fine rasterizer 210 does not produce per-sample coverage masks for those pixel tiles. Per-sample coverage masks are unnecessary since the shape code indicates that the pixel tiles are fully covered. Tiles 310, 315, 320, 330, 335, 340, and 345 are partially covered by primitive 301 and are divided into sample shapes by tile divider unit 425. In some embodiments of the present invention, each pixel tile includes 64 pixels within an 8×8 region of screen space that may be divided into a variety of sample shapes, e.g., 4×4, 8×8, 8×4, 4×8, and the like.

Figure 3B:
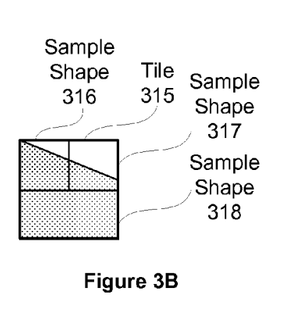
FIGS. 3B, 3C, and 3D are conceptual diagrams showing a variety of shapes in accordance with one or more aspects of the present invention.

FIG. 3B is a conceptual diagram showing tile 315 divided into sample shapes 316, 317, and 318, in accordance with one or more aspects of the present invention. Tile 315 includes 64 pixels and each pixel includes a single sample. Shape 318, including 8×4 samples, is fully covered, and is therefore output by fine rasterizer 210 without computing a per-sample coverage mask. The shape code used for sample shape 318 indicates that sample shape 318 is fully covered. The other half of tile 315 is divided into two 4×4 sample shapes, 316 and 317 that are each partially covered by primitive 301. Each sample shape is output by fine rasterizer 210 with coverage information, including a shape code indicating the specific shape.

Figure 3C:
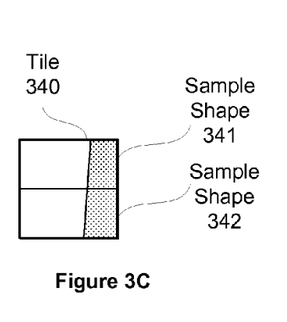
Figure 3D:
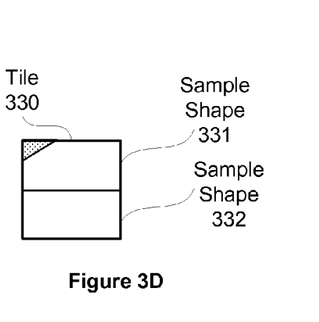

FIG. 3C is a conceptual diagram showing tile 340 divided into sample shapes 341 and 342, in accordance with one or more aspects of the present invention. Shapes 341 and 342 each include 8×4 samples, and are partially covered by primitive 301. FIG. 3D is a conceptual diagram showing tile 330 divided into sample shapes 331 and 332, in accordance with one or more aspects of the present invention. Shape 331 includes 8×4 samples, and is partially covered by primitive 301. Shape 332 is discarded since none of the samples within shape 332 are covered by primitive 301. Discarding a shape may be performed instantaneously, i.e., without requiring a clock cycle that could be used to process a shape that is at least partially covered by a primitive. Coverage masks are computed by fine rasterizer 210 for each sample within sample shapes 340, 342, and 331 by evaluating the edge equations for primitive 301.

Figure 4A:
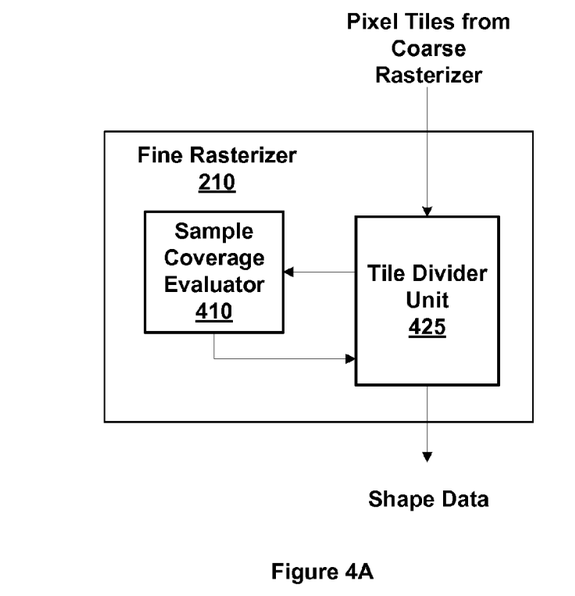
FIG. 4A is a block diagram of the fine rasterizer of FIG. 2 in accordance with one or more aspects of the present invention.

FIG. 4A is a block diagram of fine rasterizer 210 of FIG. 2, in accordance with one or more aspects of the present invention. Fine rasterizer 210 receives edge equations for pixel tiles from coarse rasterizer 225 that are intersected by an edge of a graphics primitive, i.e., include at least one covered sample. In some embodiments of the present invention, each fine rasterizer 210 is configured to compute coverage for 16 samples in parallel.

Fine rasterizer 210 includes a sample coverage evaluator 410 and a pixel tile divider unit 425. Tile divider unit 425 breaks down the pixel tiles into sample shapes and outputs any partially covered sample shapes and edge equations to sample coverage evaluator 410.

Sample coverage evaluator 410 computes a per-sample coverage mask for each of the partially covered sample shapes and outputs the coverage masks to tile divider unit 425. Tile divider unit 425 determines a shape code for each sample shape, using the coverage masks to determine the shape code for partially covered sample shapes. Tile divider unit 425 outputs shape data including a coverage information and fragment data for the sample shapes, e.g., pixel coordinates, plane equation coefficients, or the like.

The fragment data for each sample shape is represented in a compressed format that is decompressed to compute per-sample values for each sample shape. Rasterization of the fully covered sample shapes may be performed at a later time, if needed to process per-sample values. Even though sample coverage evaluator 410 is configured to produce coverage masks for a limited number of samples, e.g., 16, each clock cycle the rasterization throughput of fine rasterizer 210 can be much higher for pixel tiles that include fully covered sample shapes since the fully covered sample shapes effectively bypass sample coverage evaluator 410.

In some embodiments of the present invention, sample coverage evaluator 410 is configured to produce samples for 16 samples per clock. Therefore, fine rasterizer 210 is configured to rasterize one partially covered 4×4 sample shape, one fully covered 8×8 or 8×4 sample shape, or one 8×4 sample shape that has a fully covered 4×4 half, each clock cycle. When two or more samples are used for each pixel, the number of pixels included within each sample shape changes. TABLE 1 shows the number of pixels represented by each sample shape for various multisample modes, e.g., one sample per pixel, 2 samples per pixel, 4 samples per pixel, and 8 samples per pixel. In other embodiments of the present invention, particularly embodiments configured to produce samples for fewer or more than 16 samples per clock, the number of samples represented by each shape code may vary. Furthermore, other embodiments of the present invention may be configured to use different shape codes and meanings for each shape code and maintain the benefit of only computing per-sample values as needed to process partially or fully covered shapes.

TABLE 1

| Multisample mode | Shape code | Pixels | meaning |
| --- | --- | --- | --- |
| Aliased (one sample per pixel) | 0 × 0 | 4 × 4 | Partially covered |
| | 0 × 1 | 8 × 4 | Left half fully covered, right half fully or partially covered |
| | 0 × 2 | 8 × 4 | Left half partially covered, right half fully covered |
| | 0 × 3 | 16 × 4 or 8 × 8 | Fully covered |
| Antialiased: 2 samples per pixel | 0 × 0 | 2 × 4 | Partially covered |
| | 0 × 1 | 4 × 4 | Left half fully covered, right half fully or partially covered |
| | 0 × 2 | 4 × 4 | Left half partially covered, right half fully covered |
| | 0 × 3 | 8 × 4 | Fully covered |
| Antialiased: 4 samples per pixel | 0 × 0 | 2 × 2 | Partially covered |
| | 0 × 1 | 4 × 2 | Left half fully covered, right half fully or partially covered |
| | 0 × 2 | 4 × 2 | Left half partially covered, right half fully covered |
| | 0 × 3 | 8 × 2 | Fully covered |
| Antialiased: 8 samples per pixel | 0 × 0 | 1 × 2 | Partially covered |
| | 0 × 1 | 2 × 2 | Left half fully covered, right half fully or partially covered |
| | 0 × 2 | 2 × 2 | Left half partially covered, right half fully covered |
| | 0 × 3 | 4 × 2 | Fully covered |

Figure 4B:
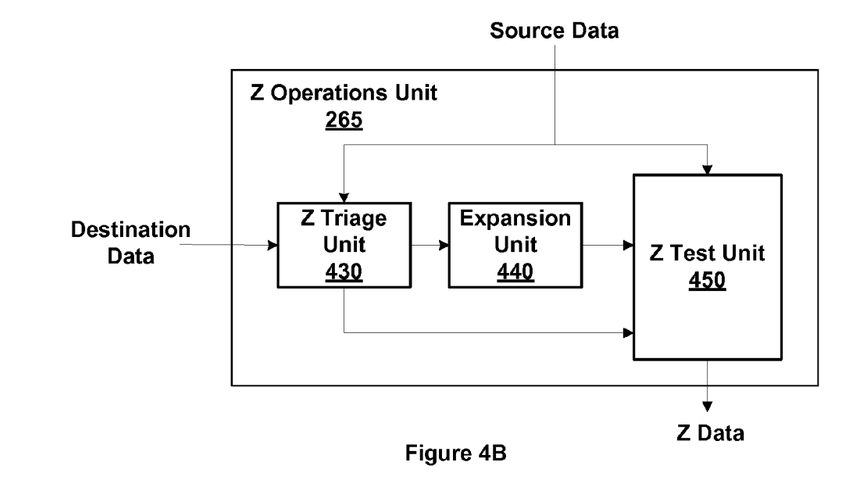
FIG. 4B is a block diagram of the Z operations unit of FIG. 2 in accordance with one or more aspects of the present invention.

FIG. 4B is a block diagram of z operations unit 265 of FIG. 2, in accordance with one or more aspects of the present invention. When graphics primitives are processed using z-only processing, z operations unit 265 receives shape data from fine rasterizer 210 including shapes that are not necessarily processed by shader 255.

Z operations unit 265 reads graphics data stored in memory, such as compressed or uncompressed z data and stencil data stored in a z buffer. Z operations unit 265 performs z testing using compressed z data. However, in some ambiguous cases, e.g., intersecting primitives, z operations unit 265 decompresses compressed z data as needed to perform z testing. Z operations unit 265 writes graphics data to memory as needed based on the results of the z testing to update the z buffer. Raster operations unit 165 writes graphics data to memory as needed based on the results of the z testing to update other buffers, such as frame buffer 141.

Systems and methods for compressing z data and decompressing z data using a planar z representation are described in U.S. patent application Ser. No. 10/878,460, "Planar Z Representation for Z Compression," filed by Molnar et al., on Jun. 28, 2004. Using compressed z data reduces the bandwidth needed to access a z buffer during image rendering. Using the planar z representation for compression minimizes the computations needed to compress the z data prior to storing it in the z buffer and permits trivial rejection or acceptance of new z data without requiring decompression of the z data read from the z buffer. Z operations unit 265 includes a z triage unit 430, an expansion unit 440, and a z test unit 450 that may be configured to compress and/or decompress z data using the planar z representation.

Specifically, a single plane equation may be used to represent the z values within a pixel tile. The coefficients for the single plane equation or tile specific coefficients corresponding to the single plane equation are a compressed planar z representation. Coefficients for two plane equations and coverage information may be used to represent the z values for two graphics primitives within the pixel tile. The coverage information indicates which samples refer to each plane equation. Alternatively, tile specific coefficients corresponding to the two plane equations and coverage information may be used to represent the z values within the pixel tile. The coefficients for the two plane equations or tile specific coefficients are a compressed planar z representation. Additional conditions exist when additional primitives lie within the pixel tile, such as at a shared vertex within a primitive mesh.

Z triage unit 430 within z operations unit 265 receives source (src) z data, specifically, tile specific coefficients and coverage from z data pipeline 275 or z values and coverage from Shader 255. Z triage unit 430 also receives destination (dst) z data from the z buffer. The dst z data may be compressed or uncompressed. Z triage unit 430 performs a trivial z test based on the minimum and maximum z values for the source z data and the destination z data without decompressing z data that is compressed, i.e., represented using tile specific coefficients. The result of the trivial z test may be used to reject the source data, accept the source data, or determine that z values for each sample position need to be compared in a z test unit 450.

For example, when a "less than" z test is specified and the maximum source z value is less than the minimum destination z value, the trivial z test result indicates that the source data should be accepted. In contrast, when a "greater than" z test is specified and the minimum source z value is greater than the maximum destination z value, the trivial z test result indicates that the source data should be rejected. Furthermore, when the destination coverage information indicates that a particular set of destination tile specific coefficients do not overlap with the source z data, the minimum and maximum destination z values computing using the particular set of destination tile specific coefficients are not compared with the minimum and maximum source z values.

The result of the trivial z test is output to expansion unit 440 and z test unit 450. When z values need to be compared for each sample position, expansion unit 440 computes samples for the source data and for the destination data when the samples are not available. Expansion unit 440 outputs the computed samples to z test unit 450 and z test unit 450 produces surviving fragment data. When z values do not need to be compared for each sample position, fragment data for several pixels may be trivially accepted or rejected without decompressing either the source or destination z data. Furthermore, the fragment data may be processed without rasterizing the fully covered sample shapes.

Z operations unit 265 formats the surviving fragment data into a compressed or uncompressed format and initiates a write request to memory controller 120 to write the z buffer tile in the z buffer. When at least a portion of the source data is not included in the surviving fragment data, raster operations unit 165 does not initiate a z buffer write request. The rasterization throughput is increased to saturate the memory bandwidth by only rasterizing partially covered sample shapes in fine rasterizer 210 and by only rasterizing z values for fully covered sample shapes as needed to perform z testing in z test unit 450.

Figure 4C:
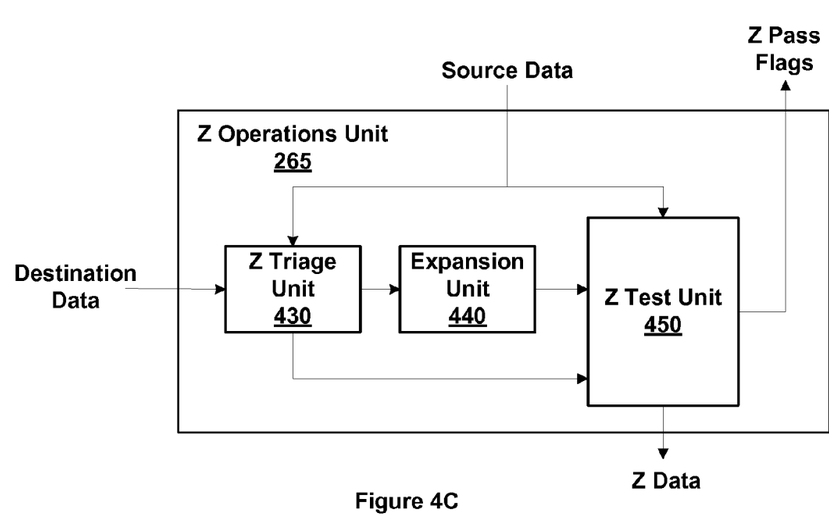
FIG. 4C is another block diagram of the Z operations unit of FIG. 2 in accordance with one or more aspects of the present invention.

FIG. 4C is another block diagram of the Z operations unit 265 of FIG. 2, in accordance with one or more aspects of the present invention. In this embodiment of the present invention z operations unit 265 is configured to perform early z or late z testing, as previously described in conjunction with FIG. 2. Z pass flags are output by z operations unit 265 to shader 255 when early z testing is enabled and the z pass flags are used by raster operations unit 165 when late z testing is enabled.

Figure 5A:
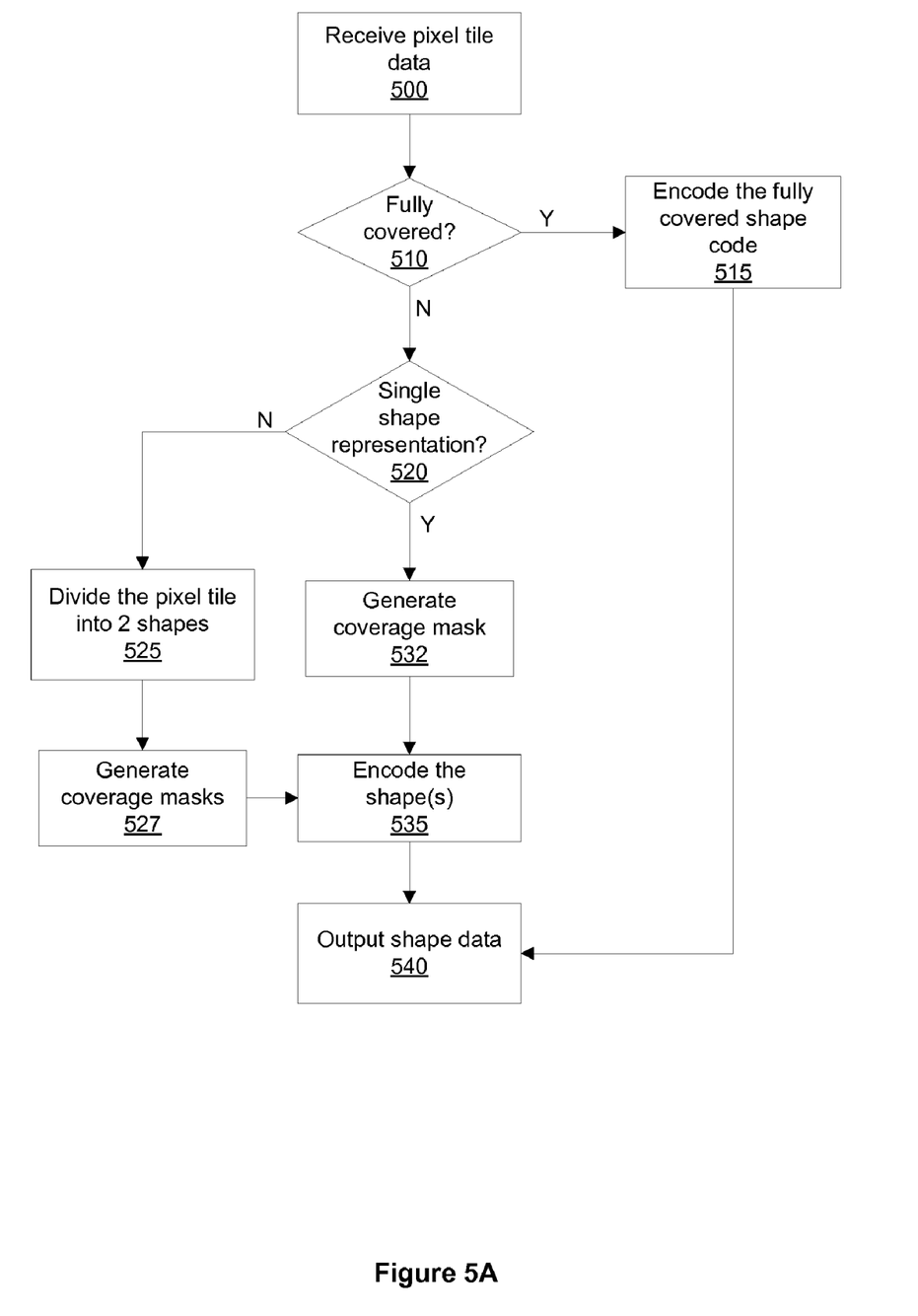
FIG. 5A illustrates an embodiment of a method of producing shape data in accordance with one or more aspects of the present invention.

FIG. 5A illustrates an embodiment of a method of producing sample shape data, in accordance with one or more aspects of the present invention. In step 500 fine rasterizer 210 receives the pixel tile data from coarse rasterizer 225. In step 510 tile divider unit 425 determines if the pixel tile is fully covered, and, if so, in step 515 tile divider unit 425 outputs the shape data, including the fully covered shape code, e.g., 0x3, and proceeds to step 540.

If, in step 510 tile divider unit 425 determines that the pixel tile is not fully covered, then in step 520 tile divider unit 425 determines if the partially covered pixel tile may be represented by a single shape. If, the partially covered pixel tile cannot be represented by a single shape, then in step 525 tile divider unit 425 divides the pixel tile into two sample shapes based on the multisample mode. Examples of possible sample shapes and sample shape codes are listed in TABLE 1. In particular, a 16×4 or an 8×8 pixel tile is divided into two 8×4 sample shapes. In other embodiments of the present invention, other sample shapes may be defined. In step 525 tile divider unit 425 outputs the two sample shapes to sample coverage evaluator 410. In step 527 sample coverage evaluator 410 determines coverage masks for the two sample shapes and outputs the coverage masks to tile divider unit 425.

If, in step 520 tile divider unit 425 determines that the partially covered pixel tile may be represented by a single shape, then in step 532 tile divider unit 425 outputs the two sample shapes to sample coverage evaluator 410. Sample coverage evaluator 410 determines coverage masks for the partially covered pixel tile and outputs the coverage mask to tile divider unit 425. In step 535 tile divider unit 425 encodes the source shape information in a shape code, as described in conjunction with FIG. 5B. In step 540 fine rasterizer 210 outputs the sample shape data including the shape codes and the coverage masks for partially covered sample shapes.

Figure 5B:
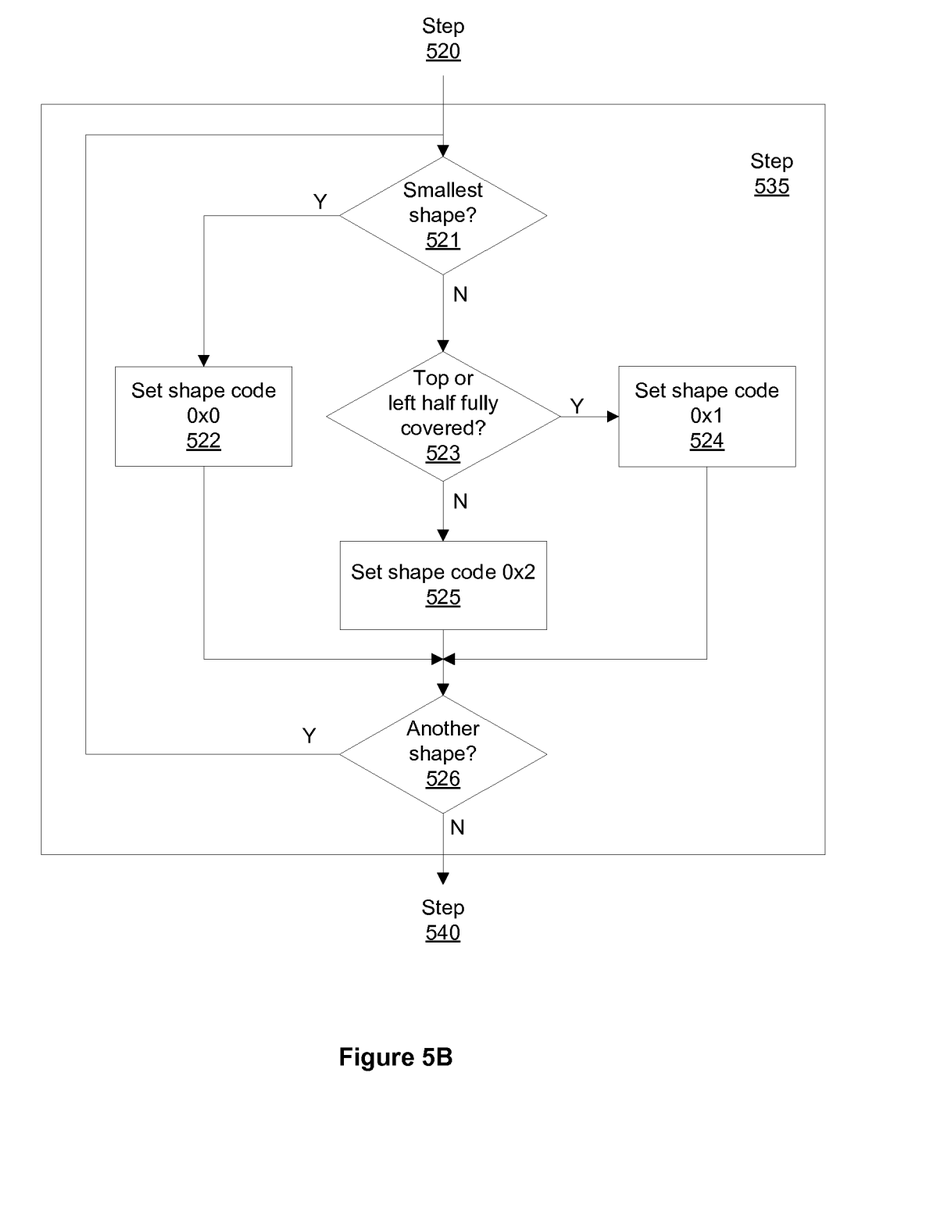
FIG. 5B illustrates an embodiment of a method of performing step 535 of FIG. 5A to encode the shapes in accordance with one or more aspects of the present invention.

FIG. 5B illustrates an embodiment of a method of performing step 535 of FIG. 5A to encode the sample shapes, in accordance with one or more aspects of the present invention. Step 535 is completed to encode a shape code for each sample shape within a pixel tile. In step 521 tile divider unit 425 determines if a first sample shape for the pixel tile is the smallest size sample shape, and, if so, in step 522 the shape code is set to 0x0. If, in step 521 tile divider unit 425 determines that the sample shape is not the smallest size sample shape, then in step 523 tile divider unit 425 determines if either the top or the left half of the sample shape is fully covered, and, if so, in step 524 the shape code is set to 0x1. Note that the shape code may be set to 0x1 when the sample shape is fully covered. If, in step 523 tile divider unit 425 determines that either the top or the left half of the sample shape is not fully covered, then in step 525 the shape code is set to 0x2. In step 526 tile divider unit 425 determines if all of the sample shapes for the pixel tile have been encoded, and if another sample shape needs to be encoded, then tile divider unit 425 returns to step 521 to process determines a shape code for another sample shape. Otherwise, tile divider unit 425 proceeds to step 540.

Figure 5C:
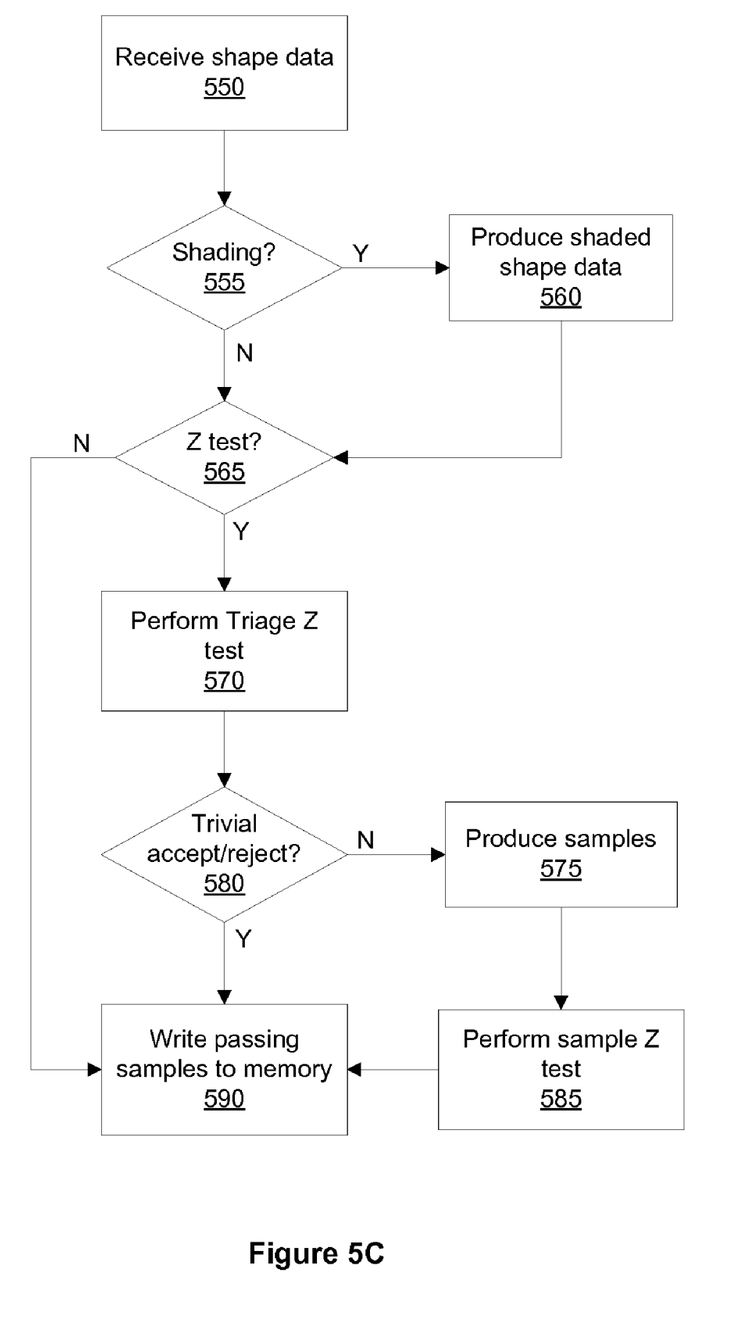
FIG. 5C illustrates another embodiment of a method of performing raster operations using the shape data in accordance with one or more aspects of the present invention.

FIG. 5C illustrates another embodiment of a method of performing raster operations using the shape data produced by fine rasterizer 210, in accordance with one or more aspects of the present invention. In step 550 shader 255 receives the shape data produced by rasterizer 150. In step 555, shader 255 determines if a shader program includes shading operations, and, if not shader 255 does not process the shape data. The shape data that is not processed by shader 255 may be provided to raster operations unit 165 through z data pipeline 275. If, in step 555 shader 255 determines that the shader program does include shading operations, then in step 560 shader 255 processes the shape data and produces shaded shape data.

In step 565 raster operations unit 165 receives the shape data produced by rasterizer 150 and/or the shaded shape data produced by shader 255, and determines if z testing is enabled. If, in step 565 z operations unit 265 determines that z testing is not enabled, then z operations unit 265 does not process the shape data and proceeds to step 590. Otherwise, in step 570 z operations unit 265 performs a z triage test and determines if the shape data can be trivially accepted or rejected. If, in step 580 z operations unit 265 determines that the shape data cannot be trivially accepted or rejected, then, in step 575 z operations unit 265 produces per-pixel samples for the shape. In step 585 z operations unit 265 performs per-sample z testing to produce z test results for the shape. In step 590 z operations unit 265 and raster operations unit 165 writes any passing samples from the shape to memory, i.e., a z buffer or frame buffer 141, respectively.

Persons skilled in the art will appreciate that any system configured to perform the method steps of FIG. 5A, 5B, or 5C, or their equivalents, are within the scope of the present invention. The current invention involves new systems and methods for improving rasterization performance when per-pixel samples values are not needed for rendering. A constant effort rasterizer may provide variable performance depending on pixel coverage of the graphics primitives being processed and the shader program.

Portions of pixel tiles that are fully covered by a graphics primitive are not rasterized to produce coverage masks unless per-sample values are needed to process a fragment. Therefore, computational resources used for rasterization are applied as needed to perform edge testing to generate coverage masks only for portions of the pixel tiles that are partially covered by the graphics primitive. Therefore, rasterization is no longer a performance bottleneck for large graphics primitives, particularly when trivial shaders are used. Rendering performance may be improved without increasing the computation resources used for rasterization by eliminating unnecessary rasterization computations. In particular, rasterization performance increases for fully covered pixel tiles which are also well-suited for compression and improved shading performance. Elimination of unnecessary per-sample coverage computations also improves rendering performance when early z or late z testing modes are used.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of varying rasterization performance based on graphics primitive pixel tile coverage, comprising:
   receiving pixel tile data for a portion of the graphics primitive intersecting a pixel tile that includes a plurality of pixels;
   determining that the pixel tile is partially covered by the portion of the graphics primitive;
   dividing the pixel tile data into a plurality of sample shapes, wherein each sample shape is associated with sample data corresponding to a different set of pixels included in the plurality of pixels, and wherein each sample shape is either fully covered by, partially covered by, or not covered by the portion of the graphics primitive;
   computing, using a rasterization unit within a graphics processor, a coverage mask only for each partially covered sample shapes included in the plurality of sample shapes;
   encoding a first shape code associated with a first partially covered sample shape based on a first coverage mask corresponding to the first partially covered sample shape; and
   transmitting sample shape data associated with the first partially covered sample shape to a raster operations unit for z-testing, wherein the sample shape data includes the first coverage mask and the first shape code.

2. The method of claim 1, further comprising:
   reading destination pixel data from a memory;
   performing a z-test operation on the first partially covered sample shape based on the sample shape data, z-plane equation coefficients associated with the pixel tile, and the destination pixel data;
   determining that the first partially covered sample shape passes the z-test operation; and
   writing the first partially covered sample shape to the memory.

3. The method of claim 2, wherein the step of performing the z-test operation includes performing a trivial z-test operation using bounds values for the destination pixel data and the first partially covered sample shape.

4. The method of claim 3, further comprising processing edge equations associated with the first partially covered sample shape to produce a per-sample value when the result of the trivial z-test operation is undetermined.

5. The method of claim 2, further comprising decompressing the destination pixel data read from the memory when the destination pixel data is stored in a compressed form.

6. The method of claim 2, further comprising compressing the first partially covered sample shape to store the first partially covered sample shape in the memory in a compressed form.

7. The method of claim 1, further comprising computing per-sample coverage only for the first partially covered sample shape.

8. The method of claim 1, wherein the first shape code indicates that a first half of the first partially covered sample shape is fully covered by the graphics primitive and a second half of the first partially covered sample shape is partially covered by the graphics primitive.

9. The method of claim 1, wherein the shape code indicates that one of the partially covered sample shapes is partially covered by the portion of the graphics primitive.

10. The method of claim 1, further comprising discarding sample shapes that are not covered by the portion of the graphics primitive.

11. A variable performance rasterization unit for producing shape data for pixel tiles, comprising:
    a coarse rasterizer configured to determine that a pixel tile including a plurality of pixels intersects a graphics primitive; and
    a fine rasterizer configured to:
      receive pixel tile data associated with the pixel tile from the coarse rasterizer unit,
      determine that the pixel tile is partially covered by a portion of the graphics primitive,
      divide the pixel tile data into a plurality of sample shapes, wherein each sample shape is associated with sample data corresponding to a different set of pixels included in the plurality of pixels, and wherein each sample shape is either fully covered by, partially covered by, or not covered by the portion of the graphics primitive,
      compute a coverage mask only for each partially covered sample shapes included in the plurality of sample shapes,
      encode a first shape code associated with a first partially covered sample shape based on the first coverage mask corresponding to the first partially covered sample shape, and
      transmit sample shape data associated with the first partially covered sample shape to a raster operations unit for z-testing, wherein the sample shape data includes the first coverage mask and the first shape code.

12. The variable performance rasterization unit of claim 11, wherein the shape data also includes plane equation coefficients and pixel positions corresponding to the first partially covered sample shape.

13. The variable performance rasterization unit of claim 12, further comprising a z-buffer configured to store the shape data as compressed z-data.

14. The variable performance rasterization unit of claim 11, wherein the fine rasterizer is configured to discard sample shapes that are not covered by the graphics primitive.

15. The variable performance rasterization unit of claim 11, wherein the fine rasterizer is configured to divide the pixel tiles into the plurality of sample shapes based on a multi-sample mode that defines the number of samples per pixel.

* * * * *